Patented Dec. 18, 1923.

1,478,015

UNITED STATES PATENT OFFICE.

DON W. BISSELL, OF BUFFALO, NEW YORK, ASSIGNOR TO NATIONAL ANILINE & CHEMICAL COMPANY, INC., OF NEW YORK, N. Y., A CORPORATION OF NEW YORK.

PRODUCTION OF TRIPHENYLMETHANE DYE.

No Drawing. Application filed November 29, 1920. Serial No. 427,126.

*To all whom it may concern:*

Be it known that I, DON W. BISSELL, a citizen of the United States, residing at Buffalo, in the county of Erie, State of New York, have invented certain new and useful Improvements in the Production of Triphenylmethane Dye; and I do hereby declare the following to be a full, clear, and exact description of the invention, such as will enable others skilled in the art to which it appertains to make and use the same.

This invention relates to an improved method of producing a triphenylmethane dye which is chemically the disulfonic acid of 3-hydroxy-4'·4"-tetraethyldiaminotriphenylcarbinol.

The invention is based upon the discovery that the triphenylmethane dye above mentioned can be produced with advantage from the disulfonic acid of 3-hydroxy-4'·4"-tetraethyldiaminotriphenylmethane by dissolving in acetic acid and oxidizing the resulting solution by means of lead peroxide, with subsequent isolation of the dye by crystallization.

In a companion application, Serial No. 427,127, filed concurrently herewith, I have described a method of producing the disulfonic acid of 3-hydroxy-4'·4"-tetraethyldiaminotriphenylmethane by condensing meta-hydroxybenzaldehyde with diethylanilin in the presence of sulfuric acid, and subjecting the resulting sulfate, without isolation of the free base, to sulfonation with oleum, with the resulting production of the disulfonic acid of 3-hydroxy-4'·4"-tetraethyldiaminotriphenylmethane which is separated in a free state. This sulfonic acid is, as I believe, a new product. It is readily obtainable in a crystalline hydrated form, but slowly loses a part or all of its water of crystallization by efflorescence at ordinary temperatures, while it gives off all of its water without melting at a temperature of about 70° C. and forms a very fine powder which easily passes back into the hydrated crystalline form when treated with water. This product is only slightly soluble in water and dilute acids but is easily soluble in alkali solutions with the formation of a salt. It requires approximately 2 equivalents of caustic soda for its solution and appears therefore to be a dibasic acid. I have found that this product is soluble to a very considerable degree in 50% acetic acid, although upon standing the hydrated crystalline modification of the product tends to separate out.

In the process of the present invention, I make use of the new sulfonic acid of 3-hydroxy-4'·4"-tetraethyldiaminotriphenylmethane, and I make use of its property of dissolving in acetic acid, and I treat the acetic acid solution with lead peroxide promptly after its formation, so that the product is not permitted to separate out in the form of its hydrate, and so that the oxidation proceeds smoothly and rapidly in solution.

The invention will be further illustrated by the following specific example:

900 pounds of water are agitated in a wooden vat and the leuco disulfonic acid is slowly added in the form of the moist hydrated crystals and in amount equivalent to about 261 pounds of the anhydrous product. The leuco sulfonic acid can thus be added in the form of the paste in which it is obtained by filtration according to the process of my said companion application. The addition is made slowly in order to get a good suspension, and about 41.5 pounds of caustic soda are then added in the form of a 40° Bé. solution. This results in dissolving the sulfonic acid of the 3-hydroxy-4'·4"-tetraethyldiaminotriphenylmethane in the form of the sodium salt. When solution is complete, about 484 pounds of glacial acetic acid are added to the solution. About 110 pounds of lead peroxide ($PbO_2$) are made into a paste with water, for example, a paste containing from 15 to 50% of the lead peroxide and this paste is slowly added to the acetic acid solution over a period of about 5 to 10 minutes. The solution is agitated during the addition, and the oxidation takes place rapidly. Under the conditions given, the leuco acid, as well as the oxidation product, remains in solution. The amount of lead peroxide required for the oxidation can be ascertained by the colorimeter on an aliquot portion of the solution, so that both under-oxidation and objectionable over-oxidation will be avoided. After the completion of the oxidation, and while the agitation is continued, there is added about 94 pounds of anhydrous sodium sulfate, or the equivalent of the crystalline sodium sulfate, and the stirring is continued until the lead is completely precipitated as lead sulfate. The subsequent filtration of this precipitated lead sulfate can be greatly facilitated by the addition of a small amount, e. g., 25 pounds of amorphous silica. The solution is then filtered in a filter press and the filtrate collected and cooled to a temperature of 0° C. 230 pounds of caustic soda, in the form of a 40° Bé. solution, are then added, while keeping the temperature under 20° C. The solution is then allowed to stand, with agitation, for a period of several hours, to permit crystallization of the dyestuff, which is then filtered out in a filter press and washed with a saturated salt solution and then dried at a temperature of about 70 to 90° C.

I claim:

1. The method of producing a triphenylmethane dye which comprises subjecting an acetic acid solution of the disulfonic acid of 3-hydroxy-4'-4''-tetraethyldiaminotriphenyl methane containing approximately 17–18% of the sulfonic acid to oxidation with lead peroxide, and separating the resulting dye from solution by crystallization.

2. The method of producing a triphenylmethane dye which comprises subjecting an acetic acid solution of the disulfonic acid of 3-hydroxy-4'-4''-tetraethyldiaminotriphenyl methane to oxidation with lead peroxide, the amount of lead peroxide being regulated by examination of an aliquot part of the solution with a colorimeter, whereby both under-oxidation and objectionable over-oxidation can be avoided.

3. In the production of a triphenylmethane dye by subjecting the disulfonic acid of 3-hydroxy-4'-4''-tetraethyldiaminotriphenyl methane to oxidation in an acetic acid solution with lead peroxide, the steps which comprise precipitating lead sulphate, adding amorphous silica, filtering and crystallizing out the dye in the presence of salts.

In testimony whereof I affix my signature.

DON W. BISSELL.